US009253362B2

(12) United States Patent
Urakawa

(10) Patent No.: US 9,253,362 B2
(45) Date of Patent: Feb. 2, 2016

(54) INFORMATION PROCESSING APPARATUS AND NON-TRANSITORY STORAGE MEDIUM STORING INSTRUCTIONS EXECUTABLE BY INFORMATION PROCESSING APPARATUS

(71) Applicant: Yutaka Urakawa, Nagoya (JP)

(72) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/217,674

(22) Filed: Mar. 18, 2014

(65) Prior Publication Data

US 2014/0293332 A1    Oct. 2, 2014

(30) Foreign Application Priority Data

Mar. 28, 2013    (JP) .................................. 2013-070033

(51) Int. Cl.
G06F 3/12    (2006.01)
H04N 1/32    (2006.01)
H04N 1/00    (2006.01)

(52) U.S. Cl.
CPC .......... *H04N 1/32358* (2013.01); *G06F 3/1204* (2013.01); *G06F 3/1212* (2013.01); *G06F 3/1268* (2013.01); *G06F 3/1292* (2013.01); *H04N 1/00281* (2013.01); *G06F 3/1236* (2013.01); *H04N 2201/0039* (2013.01); *H04N 2201/0055* (2013.01); *H04N 2201/0075* (2013.01); *H04N 2201/0094* (2013.01)

(58) Field of Classification Search
CPC .......... H04N 1/32358; H04N 1/00281; H04N 2201/0039; H04N 2201/0075; H04N 2201/0055; H04N 2201/0094; G06F 3/1212; G06F 3/1204; G06F 3/1268; G06F 3/1292; G06F 3/1236

USPC .................................................. 358/1.15, 1.1
See application file for complete search history.

(56) References Cited

U.S. PATENT DOCUMENTS

2009/0089524 A1*    4/2009    Fujihara et al. ................ 711/162
2013/0258381 A1*   10/2013    Sato ............................. 358/1.13

FOREIGN PATENT DOCUMENTS

JP    2006-331072 A    12/2006
JP    2012-133499 A     7/2012

* cited by examiner

*Primary Examiner* — Martin Mushambo
(74) *Attorney, Agent, or Firm* — Scully, Scott, Murphy & Presser, P.C.

(57) ABSTRACT

An information processing apparatus includes a first communication interface for performing first wireless communication with an external device when a distance between the external device and the first communication interface becomes equal to or less than a first distance. The information processing apparatus executes: a first display control processing in which after the first wireless communication is started, the information processing apparatus displays an input screen which accepts input of related information relating to a processing for communication data; an obtaining processing in which after the first wireless communication is started, the information processing apparatus obtains the communication data transmitted from the external device; and a data-processing execution processing in which when the input of the related information and the obtainment of the communication data are completed, the information processing apparatus executes a data processing for the communication data based on the related information.

18 Claims, 11 Drawing Sheets

INFORMATION PROCESSING APPARATUS AND NON-TRANSITORY STORAGE MEDIUM STORING INSTRUCTIONS EXECUTABLE BY INFORMATION PROCESSING APPARATUS

CROSS REFERENCE TO RELATED APPLICATION

The present application claims priority from Japanese Patent Application No. 2013-070033, which was filed on Mar. 28, 2013, the disclosure of which is herein incorporated by reference in its entirety.

BACKGROUND OF THE INVENTION

1. Field of the Invention

The present invention relates to an information processing apparatus configured to communicate with an external device and a non-transitory storage medium storing a plurality of instructions executable by a processor of the information processing apparatus.

2. Description of the Related Art

There is known a data processing system in which when a document to be uploaded to a server is selected on a client computer, the server causes the client computer to display a list of upload candidate folders. The data processing system starts a document upload processing when an upload folder to which the selected documents are to be uploaded is selected from the list of upload candidate folders on the client computer.

SUMMARY OF THE INVENTION

In the above-described data processing system, the document upload processing is started after the selection of the upload folder. Thus, in a case where it takes a relatively long time for an operation of selecting the upload folder, for example, a relatively long time is unfortunately required from the start of the operation of selecting the upload folder to a completion of the document upload processing, leading to lower operability of a user.

The present invention provides an information processing apparatus including: a first communication interface configured to carry out first wireless communication with an external device according to a first communication standard when a distance between the external device and the first communication interface becomes equal to or less than a first distance; a processor; and a memory configured to store a plurality of instructions. The plurality of instructions, when executed by the processor, cause the information processing apparatus to execute: a first display control processing in which after the first wireless communication is started, the information processing apparatus controls a display device thereof to display an input screen which accepts an input of related information that is information relating to a processing to be executed for at least one communication data set; a first obtaining processing in which after the first wireless communication is started, the information processing apparatus obtains the at least one communication data set transmitted from the external device; and a data-processing execution processing in which when the input of the related information and the obtainment of the at least one communication data set in the first obtaining processing are completed, the information processing apparatus executes a data processing for the obtained at least one communication data set based on the related information.

The present invention also provides a non-transitory storage medium storing a plurality of instructions executable by a processor of an information processing apparatus. The information processing apparatus includes: a first communication interface configured to carry out first wireless communication with an external device according to a first communication standard when a distance between the external device and the first communication interface becomes equal to or less than a first distance; and the processor. The plurality of instructions, when executed by the processor, cause the information processing apparatus to execute: a first display control processing in which after the first wireless communication is started, the information processing apparatus controls a display device thereof to display an input screen which accepts an input of related information that is information relating to a processing to be executed for at least one communication data set; a first obtaining processing in which after the first wireless communication is started, the information processing apparatus obtains the at least one communication data set transmitted from the external device; and a data-processing execution processing in which when the input of the related information and the obtainment of the at least one communication data set in the first obtaining processing are completed, the information processing apparatus executes a data processing for the obtained at least one communication data set based on the related information.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

<Structure of Network 10>

Figure 1:
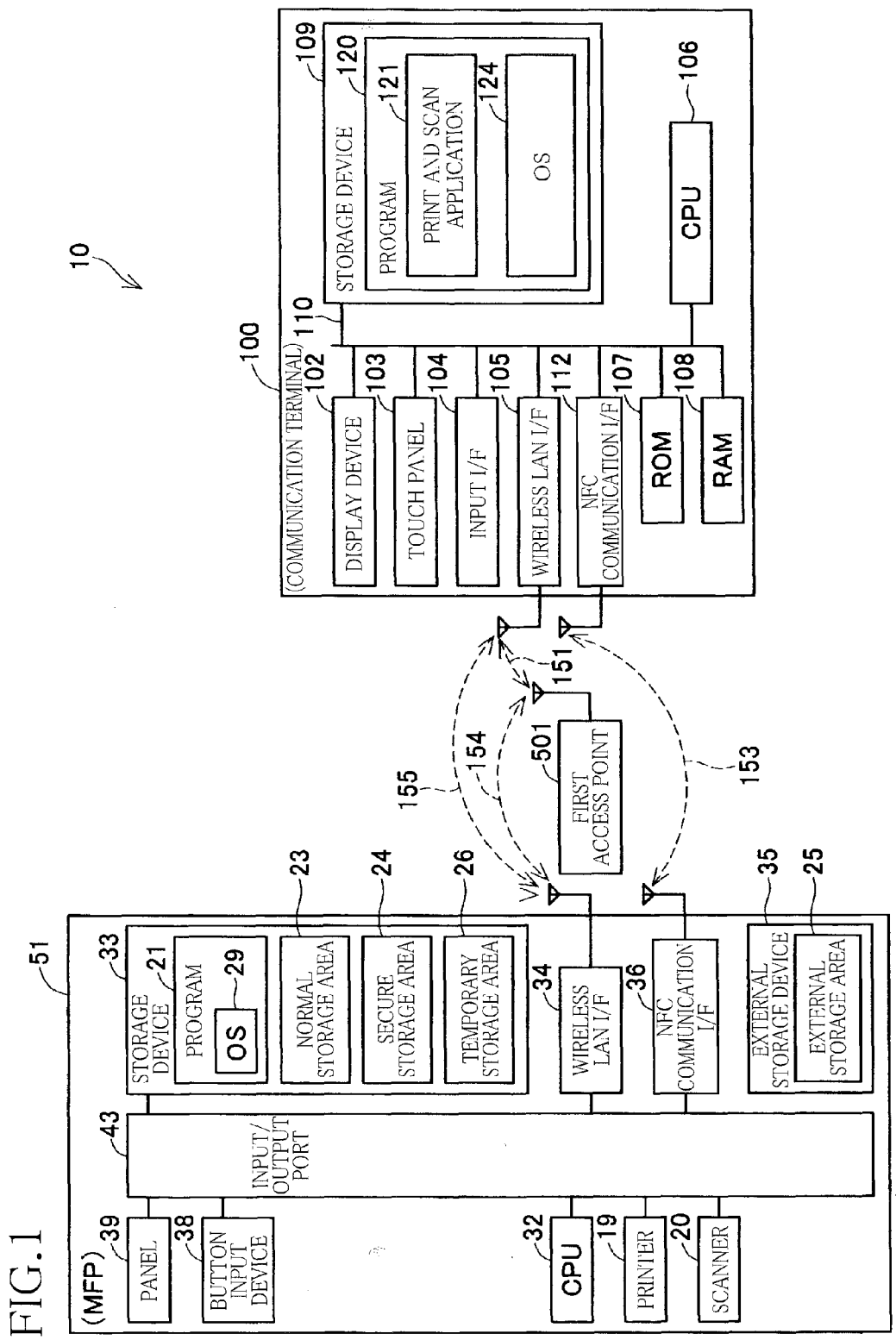
FIG. 1 is a block diagram illustrating a structure of a network.

FIG. 1 illustrates a structure of a network 10. The network 10 includes a communication terminal (a communication terminal device or a communication device) 100, an MFP 51, and a first access point 501. Here, the MFP is a multi-function peripheral having functions such as a printing function, a scanning function, and a copying function.

The communication terminal 100 includes an NFC communication interface 112 which can communicate with an NFC communication interface 36 of the MFP 51 over wireless communication 153 according to the NFC (Near Field Communication) standard (hereinafter may be referred to as "NFC wireless communication" or "NFC communication"). In the present embodiment, the NFC wireless communication is carried out according to ISO/IEC 21481 or 18092.

The communication terminal 100 includes a wireless LAN interface 105 which can communicate with a wireless LAN interface 34 of the MFP 51 in an infrastructure mode over wireless communication 151, 154 according to the wireless LAN standard (hereinafter may be referred to as "wireless LAN communication"). The wireless LAN interface 105 can also communicate directly with the wireless LAN interface 34 of the MFP 51 over wireless communication 155 according to the WiFi Direct (WFD) standard (hereinafter may be referred to as "WFD wireless communication" or "WFD communication"). The communication terminal 100 can establish a connection with the MFP 51 according to the WFD standard to establish a WFD network. The WFD wireless communication is carried out according to IEEE (the Institute of Electrical and Electronics Engineers) 802.11 and standards equivalent to it (e.g., 802.11a, 11b, 11g, and 11n). That is, the communication terminal 100 can transmit one or more files (as one example of data sets) to the MFP 51 over the wireless communication by executing a print and scan application 121. Also, the communication terminal 100 can cause the MPF 51 to store and/or print the transmitted files.

<Structure of Communication Terminal 100>

The communication terminal 100 is a mobile device such as a mobile phone and a mobile terminal device. The communication terminal 100 includes a display device 102, a touch panel 103, an input interface 104, the wireless LAN interface 105, the NFC communication interface 112, a central processing unit (CPU) 106, a read only memory (ROM) 107, a random access memory (RAM) 108, and a storage device 109. These devices are connected to each other via an input/output port 110.

The display device 102 receives an image signal from the CPU 106 and displays an image based on the received image signal. Examples of the display device 102 include a liquid crystal display (LCD) and an organic electroluminescent panel. The touch panel 103 is formed of a transparent material and superposed on an upper surface of the display device 102. When touched with an input object such as a finger of a user or a stylus, the touch panel 103 detects a position of the touch and transmits information about the detected position to the CPU 106. The input interface 104 is constituted by operation buttons, for example.

The NFC communication interface 112 is an interface for carrying out the NFC wireless communication 153. Various kinds of information about communication settings such as an IP address and an SSID (Service Set Identifier) is unnecessary for establishing the NFC wireless communication 153. The wireless LAN interface 105 is an interface for carrying out the wireless LAN communication 151, 155. A communicable distance or range within which the wireless LAN communication 151, 155 can be carried out is greater than that a communicable distance or range within which the NFC wireless communication 153 can be carried out. Also, a communication speed or rate in the wireless LAN communication 151, 155 is faster than that in the NFC wireless communication 153.

The CPU 106 executes programs stored in the storage device 109. The RAM 108 temporarily stores information required for processings to be executed by the CPU 106. The storage device 109 is constituted by a flash memory, a hard disc (HDD), a buffer in the CPU 106, and other similar devices in combination. The storage device 109 stores WFD-connection setting information and various data files. The WFD-connection setting information will be explained later. The storage device 109 stores a program 120. The program 120 includes the application 121 and an operating system (OS) 124. The CPU 106 executes processings according to the program 120.

The application 121 causes the CPU 106 to execute, e.g., a processing for transmitting a print command from the communication terminal 100 to the MFP 51, for example. The OS 124 is a program which provides basic functions and common services for the application 121 and other programs and devices. The OS 124 includes a program for causing the wireless LAN interface 105 and the NFC communication interface 112 to carry out wireless communication. The OS 124 also provides an application programming interface (API) for causing each program to obtain information obtained by hardware or for causing each program to output a command to hardware.

<Structure of MFP 51>

There will be next explained a structure of the MFP 51. The MFP 51 mainly includes a CPU 32, a storage device 33, an external storage device 35, the wireless LAN interface 34, the NFC communication interface 36, a button input device 38, a panel 39, a printer 19, and a scanner 20. These devices are communicable with each other via an input/output port 43.

The CPU 32 executes a program 21 stored in the storage device 33. The storage device 33 is constituted by a RAM, a ROM, a flash memory, a hard disc (HDD), a buffer in a CPU 72, and other similar devices in combination. The storage device 33 stores the program 21. The program 21 includes an OS 29. The storage device 33 also stores information, which will be explained later, such as a file count value D, a storage-area count value U, processing identification information, designated storage area information, and storing-method identification information.

The storage device 33 includes a normal storage area 23 (as one example of a first storage area), a secure storage area 24 (as one example of a second storage area), and a temporary storage area 26. Each of the normal storage area 23 and the secure storage area 24 is an area for storing various kinds of data files. Each of the normal storage area 23 and the secure storage area 24 may be a storage area in a non-transitory memory such as a flash memory. The secure storage area 24 is a storage area with higher security than the normal storage area 23. For example, a preset password may need to be entered to access the files stored in the secure storage area 24. Alternatively, the secure storage area 24 may store, for example, first data (as one example of first communication data) which is data to be managed with higher security than second data (as one example of second communication data) stored in the normal storage area 23. The temporary storage area 26 is an area in which data received from the communication terminal 100 is temporarily stored before stored in an area such as the normal storage area 23, the secure storage area 24, and an external storage area 25. The temporary storage area 26 may be a storage area in a transitory memory such as a RAM.

The external storage device 35 is a demountable storage device. One Example of the external storage device 35 is a non-transitory memory such as a memory card and a USB memory. The external storage device 35 includes the external storage area 25. The external storage area 25 is an area for storing various kinds of data files.

The NFC communication interface 36 is an interface for carrying out the NFC wireless communication 153. The wireless LAN interface 34 is an interface for carrying out the wireless LAN communication 154, 155. The button input device 38 includes keys for various functions of the MFP 51. The button input device 38 may be formed integrally with the panel 39 as a touch panel. The panel 39 displays various kinds of information about the functions of the MFP 51. The printer 19 prints an image based on the file stored in the storage device 33. The scanner 20 reads an image on a document.

<Operations of MFP 51>

Figure 2:
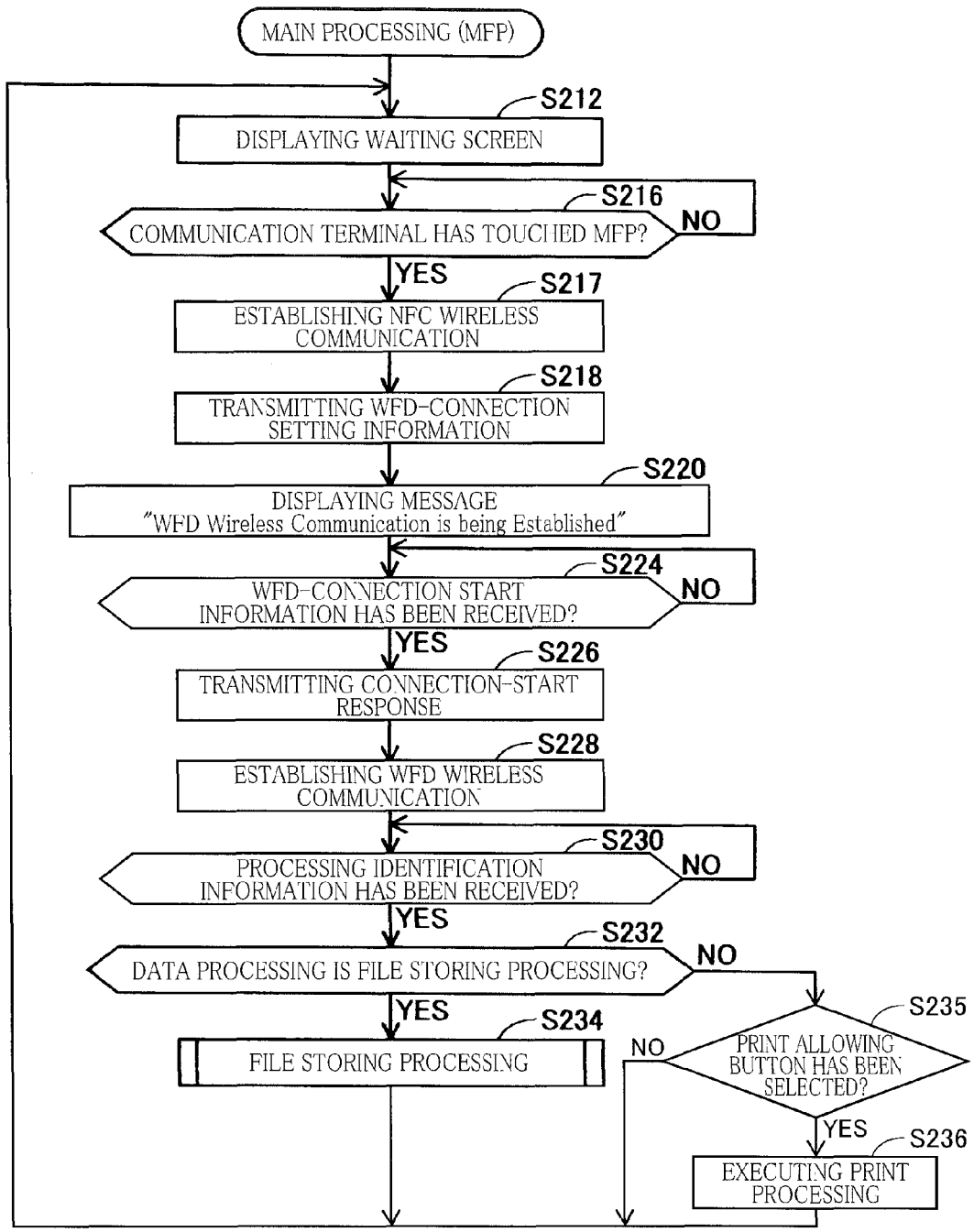
FIG. 2 is a flow chart for explaining a main processing.

There will be next explained a main processing to be executed by the MFP 51 with reference to FIG. 2. A flow illustrated in FIG. 2 begins when the MFP 51 is turned on.

This flow begins with S212 at which the CPU 32 displays a waiting screen on the panel 39. The CPU 32 at S216 determines whether the communication terminal 100 has touched the MFP 51 or not. Specifically, the CPU 32 determines whether the NFC communication interface 112 of the communication terminal 100 has been brought into close proximity to the NFC communication interface 36 of the MFP 51 or not, in other words, the CPU 32 determines whether the NFC communication interface 112 of the communication terminal 100 has been placed within a predetermined distance or range around the NFC communication interface 36 or not. One example of the predetermined distance is about 10 cm. When a negative decision is made at S216 (S216: NO), the CPU 32 repeats the processing at S216. When a positive decision is made at S216 (S216: YES), this flow goes to S217.

The CPU 32 at S217 controls the NFC communication interface 36 to establish the NFC wireless communication 153. The CPU 32 at S218 transmits the WFD-connection setting information to the communication terminal 100 over the NFC wireless communication 153. The WFD-connection setting information is used for establishing the WFD wireless communication 155. One example of information contained in the WFD-connection setting information is a designated SSID. The designated SSID is an SSID which is designated by the MFP 51 and whose character string changes upon each issue. A one-time SSID may be used alternatively.

The CPU 32 at S220 notifies the user that various kinds of information for establishing the WFD wireless communication is being transferred. For example, the CPU 32 may control the panel 39 to display a character string "WFD Wireless Communication is being Established". The CPU 32 at S224 determines whether WFD-connection start information has been received from the communication terminal 100 over the NFC wireless communication 153 or not. The WFD-connection start information is information for notifying the MFP 51 that a processing for establishing the WFD wireless communication 155 has been started on the communication terminal 100. When a negative decision is made at S224 (S224: NO), the CPU 32 repeats the processing at S224. When a positive decision is made at S224 (S224: YES), this flow goes to S226 at which the CPU 32 transmits a connection-start response to the communication terminal 100 over the NFC wireless communication 153. The connection-start response is information for notifying the communication terminal 100 that the MFP 51 has started the processing for establishing the WFD wireless communication 155. The CPU 32 at S228 establishes the WFD wireless communication 155.

The CPU 32 at S230 determines whether the processing identification information has been received from the communication terminal 100 over the WFD wireless communication 155 or not. The processing identification information is information for identifying a type of the data processing to be executed by the MFP 51. The type of the data processing may be designated or selected by the user operating the communication terminal 100. Examples of the data processing include a file storing processing and a print processing. The file storing processing is a processing for storing a received file or files received from the communication terminal 100, into a selected one of the plurality of storage areas. The print processing is a processing for causing the printer 19 to print the received file or files. The processing identification information contains number-of-file information representative of the number of received files. The processing identification information may also contain security information indicative of a high security file. For example, in a case where the number of received files is two or more, the security information may indicate the ordinal numbers of files to be received as the high security files. The high security file is a file to be managed with higher security. One example of the high security file is a file containing personal information. The high security file may be set in advance by the user in creation of the file. When a negative decision is made at S230 (S230: NO), this processing repeats the processing at S230. When a positive decision is made at S230 (S230: YES), this flow goes to S232.

The CPU 32 at S232 determines whether the data processing is the file storing processing or not. When a negative decision is made at S232 (S232: NO), this flow goes to S235. The CPU 32 at S235 controls the panel 39 to display a print allowing screen for the user to allow execution of the print processing. The print allowing screen contains, for example, a button image indicating that the execution of the print processing is allowed and a button image indicating that the execution of the print processing is not allowed. When the button image indicating that the execution of the print processing is not allowed is selected, this flow returns to S212. When the button image indicating that the execution of the print processing is allowed is selected, this flow goes to S236. The CPU 32 at S236 executes the print processing in which the printer 19 prints an image or images based on the received file or files, and this flow returns to S212.

When a positive decision is made at S232 (S232: YES), this flow goes to S234 at which the CPU 32 executes the file storing processing.

<File Storing Processing>

Figure 3:
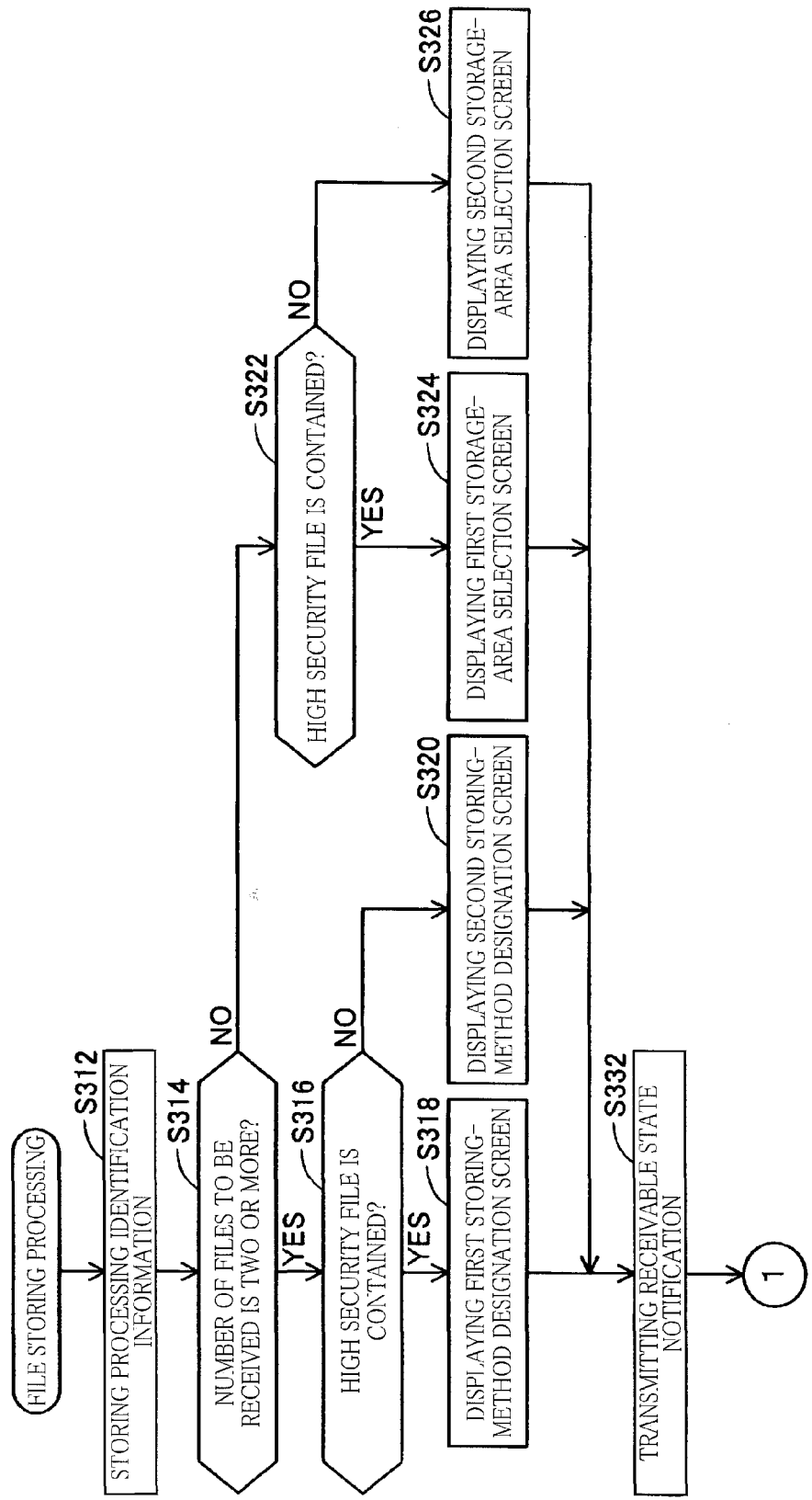
FIG. 3 is a flow chart for explaining a file storing processing.
Figure 4:
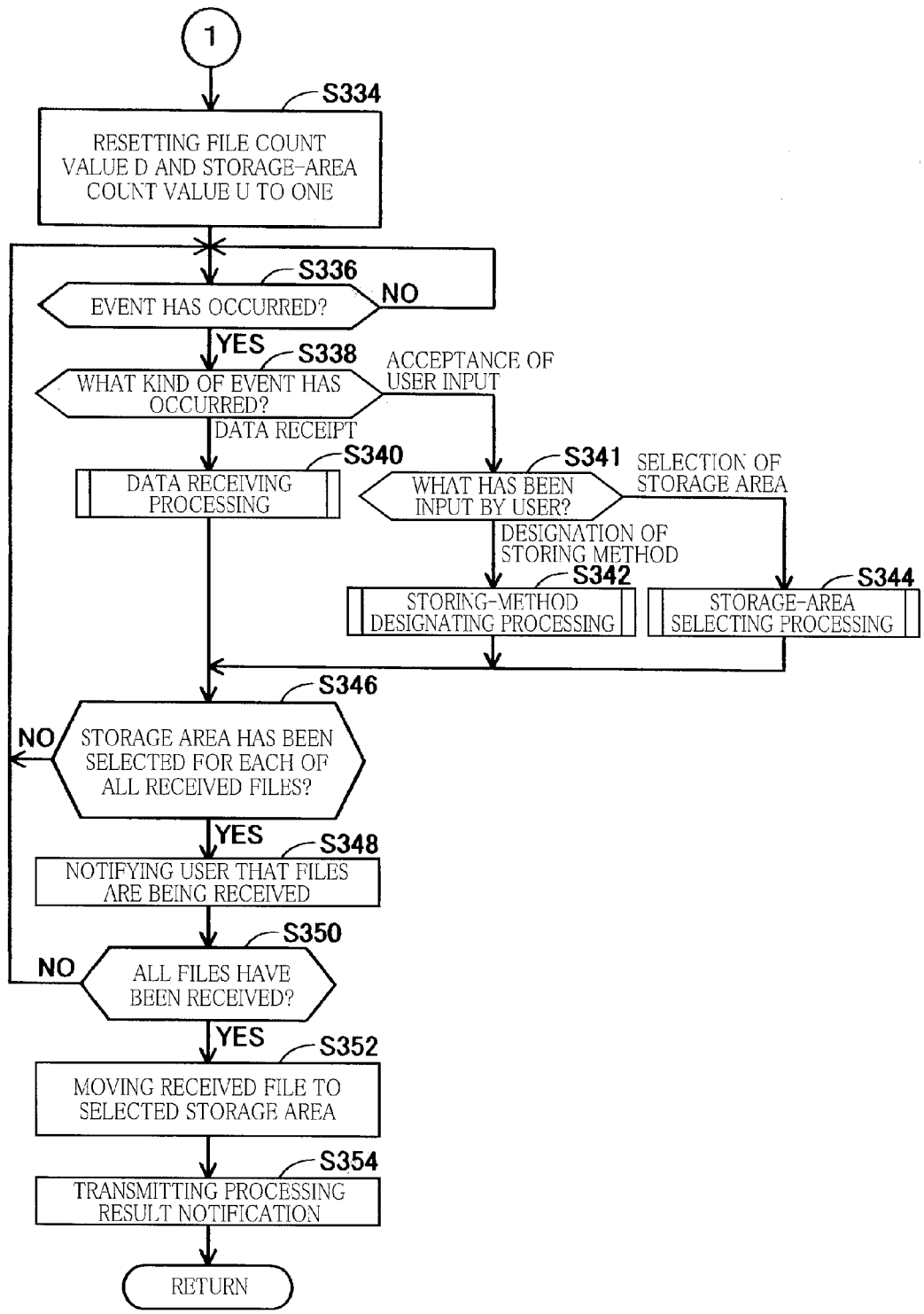
FIG. 4 is a flow chart for explaining the file storing processing.

There will be next explained the file storing processing at S234 with reference to FIGS. 3 and 4. The CPU 32 at S312 stores the processing identification information received from the communication terminal 100, into the storage device 33. The CPU 32 at S314 determines whether or not the number of files to be received from the communication terminal 100 is two or more. This determination is made based on the number-of-file information contained in the processing identification information. When a positive decision is made at S314 (S314: YES), this flow goes to S316.

The CPU 32 at S316 determines whether the high security file is included among the files to be received from the communication terminal 100 or not. This determination is made based on the security information contained in the processing identification information. When a positive decision is made at S316 (S316: YES), this flow goes to S318.

Figure 9:
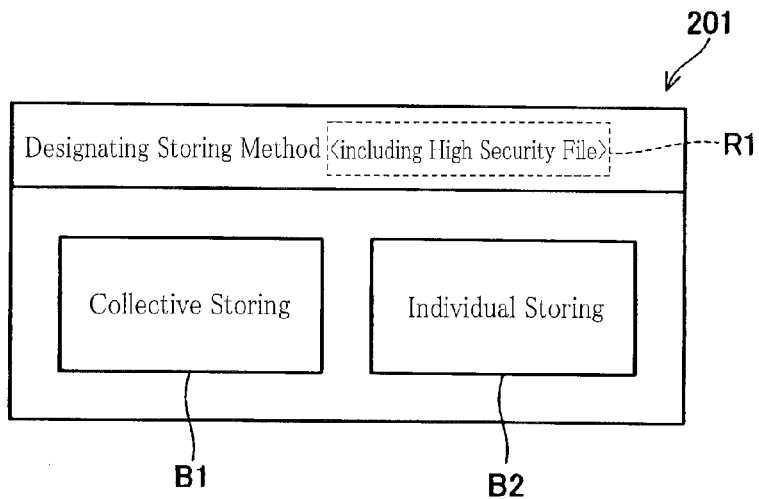
FIG. 9 is a view illustrating one example of a first storing-method designation screen.

The CPU 32 at S318 displays a first storing-method designation screen 201 on the panel 39. FIG. 9 illustrates one example of the first storing-method designation screen 201. The first storing-method designation screen 201 contains button images B1, B2. The button image B1 is an image for the user to select a collectively storing processing. The collectively storing processing is a processing in which, in the case where the number of the received files is two or more, the plurality of received files are stored into the same storage area collectively. The button image B2 is an image for the user to select an individually storing processing. The individually storing processing is a processing in which, in the case where the number of the received files is two or more, the plurality of received files are individually stored into the individually designated storage areas, more specifically, the user designates, for each of the plurality of received files, one of the storage areas to which the received file is to be stored.

The first storing-method designation screen 201 also contains information indicating that the received files include the high security file or files. In FIG. 9, the first storing-method designation screen 201 contains a region R1 on which is displayed a character string representative of the information. Upon completion of the processing at S318, this flow goes to S332.

Figure 10:
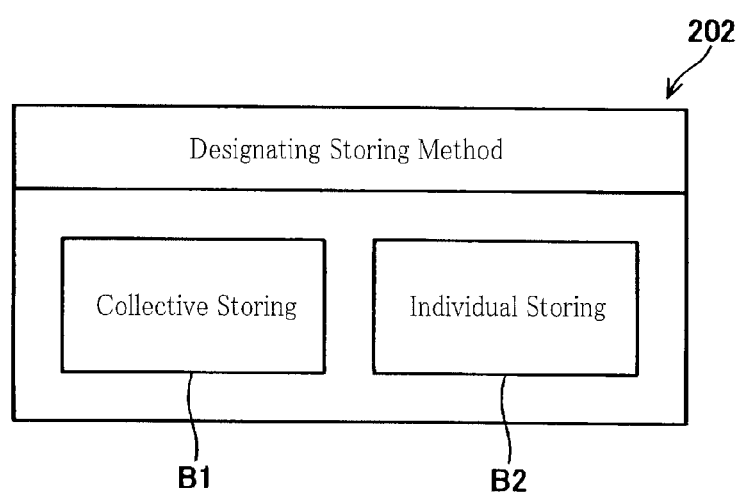
FIG. 10 is a view illustrating one example of a second storing-method designation screen.

When a negative decision is made at S316 (S316: NO), this flow goes to S320. The CPU 32 at S320 displays a second storing-method designation screen 202 on the panel 39. FIG. 10 illustrates one example of the second storing-method designation screen 202. The second storing-method designation screen 202 contains the button images B1, B2 which are similar to those contained in the first storing-method designation screen 201. It is noted that the second storing-method designation screen 202 does not contain the information indicating that the received files include the high security file or files. Upon completion of the processing at S320, this flow goes to S332.

When the CPU 32 at S314 determines that the number of files to be received from the communication terminal 100 is one (S314: NO), the CPU 32 determines that there is no need to designate the storing method, and this flow goes to S322. The CPU 32 at S322 determines whether the file to be received from the communication terminal 100 is the high security file or not. This determination is made based on the security information contained in the processing identification information. When a positive decision is made at S322 (S322: YES), this flow goes to S324.

Figure 11:
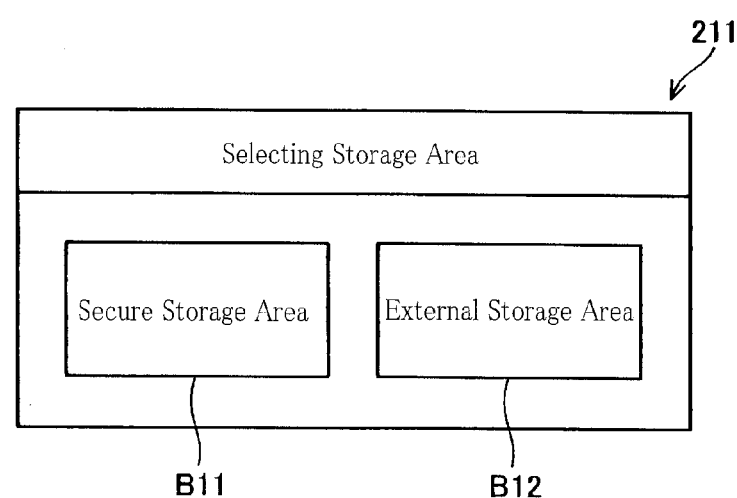
FIG. 11 is a view illustrating one example of a first storage-area selection screen.

The CPU 32 at S324 displays a first storage-area selection screen 211 on the panel 39. FIG. 11 illustrates one example of the first storage-area selection screen 211. The first storage-area selection screen 211 contains button images B11, B12. The button image B11 is an image for the user to select the secure storage area 24 as an area into which the received file is to be stored. The button image B12 is an image for the user to select the external storage area 25 as an area into which the received file is to be stored.

Figure 12:
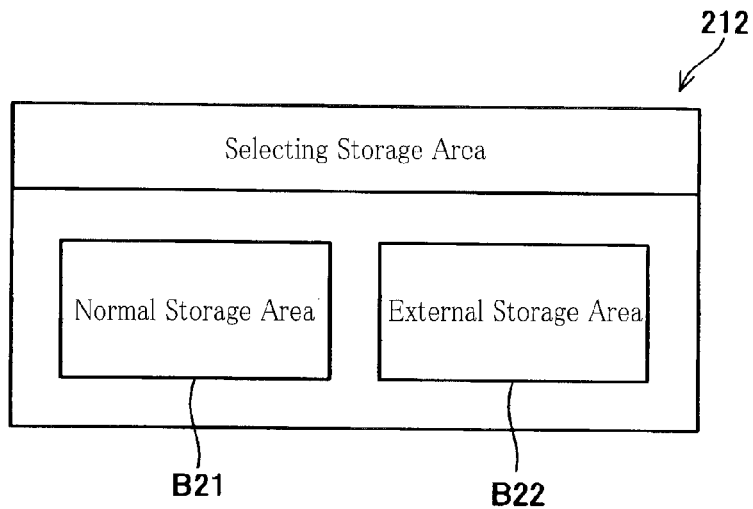
FIG. 12 is a view illustrating one example of a second storage-area selection screen.

When a negative decision is made at S322 (S322: NO), this flow goes to S326. The CPU 32 at S326 displays a second storage-area selection screen 212 on the panel 39. FIG. 12 illustrates one example of the second storage-area selection screen 212. The second storage-area selection screen 212 contains button images B21, B22. The button image B21 is an image for the user to select the normal storage area 23 as an area into which the received file is to be stored. The button image B22 is an image for the user to select the external storage area 25 as an area into which the received file is to be stored. Upon completion of the processing at S324 or S326, this flow goes to S332.

The CPU 32 at S332 transmits a receivable state notification to the communication terminal 100 over the WFD wireless communication 155. The receivable state notification is information for notifying the communication terminal 100 that the MFP 51 can receive data at this point in time.

The CPU 32 at S334 resets each of the file count value D and the storage-area count value U to one. The file count value D is a count value representative of the number of files received. The storage-area count value U is a value representative of the number of selections of storage area by the user to store the received files. The MFP 51 waits for a start of receipt of a file or files transmitted from the communication terminal 100 and also waits for a user input to the button input device 38.

Processings at S336-S350 are for accepting selections of a data receiving processing (S340), a storing-method designating processing (S342), and a storage-area selecting processing (S344) in parallel. Specifically, the CPU 32 at S336 waits for an occurrence of an event. When an event of receiving data has occurred, this flow goes to S340 for the data receiving processing. When an event of accepting a user input for designating the storing method, this flow goes to S342 for the storing-method designating processing. When an event of accepting a user input for selecting a storage area has occurred, this flow goes to S344 for the storage-area selecting processing. Upon completion of the processing at S340, S342, or S344, this processing returns to S336 at which the CPU 32 waits for the occurrence of the event.

The CPU 32 at S336 determines whether an event has occurred or not. When a negative decision is made at S336 (S336: NO), the CPU 32 repeats the processing at S336. When a positive decision is made at S336 (S336: YES), this flow goes to S338.

The CPU 32 at S338 determines the type of the event having occurred. When the event having occurred is data receipt (S338: DATA RECEIPT), this flow goes to S340 at which the CPU 32 executes the data receiving processing. The data receiving processing is a processing for receiving data from the communication terminal 100 and stores the data into the temporary storage area 26. The data receiving processing will be described later in detail. When the event having occurred is an acceptance of a user input (S338: ACCEPTANCE OF USER INPUT), this flow goes to S341.

The CPU 32 at S341 determines what has been input by the user. When the storing method has been designated by the user (S341: DESIGNATION OF STORING METHOD), this flow goes to S342 at which the CPU 32 executes the storing-method designating processing. The storing-method designating processing is a processing for accepting a designation of which of the collectively storing processing and the individually storing processing is to be executed. The storing-method designating processing will be described later in detail. When the input operation is an operation for selecting the storage area or areas (S341: SELECTION OF STORAGE AREA), this flow goes to S344 at which the CPU 32 executes the storage-area selecting processing. The storage-area selecting processing is a processing for accepting a selection of storage area or areas into which the received file or files are to be stored. The storage-area selecting processing will be described later in detail.

Upon completion of the processing at S340, S342, or S344, this flow goes to S346. The CPU 32 at S346 determines whether or not the storage area has been selected for each of all the received files received from the communication terminal 100. When a negative decision is made at S346 (S346: NO), this flow returns to S336. When a positive decision is made at S346 (S346: YES), the CPU 32 determines that the user operation for selecting the storage area or areas is completed, and the CPU 32 waits for completion of receipt of the files, and this flow goes to S348.

The CPU 32 at S348 notifies the user that the files are being received from the communication terminal 100. For example, the CPU 32 may control the panel 39 to display a character string "Files are being Received". The CPU 32 at S350 whether all the files have been received or not. When a negative decision is made at S350 (S350: NO), this flow returns to S336. When a positive decision is made at S350 (S350: YES), the CPU 32 determines that receipt of all the files is completed, and this flow goes to S352.

The CPU 32 at S352 stores, into the storage area or areas selected in the storage-area selecting processing, all the received file or files temporarily stored in the file storage area of the temporary storage area 26. The CPU 32 then deletes all the received files stored in the temporary storage area 26. As a result, the processing for moving the received files is completed.

The CPU 32 at S354 transmits a processing result notification to the communication terminal 100 over the WFD wireless communication 155. The processing result notification is information for notifying the communication terminal 100 of whether all the files transmitted from the communication terminal 100 have been successfully received and stored or not. As a result, the file storing processing (S234) is finished, and this flow returns to S212.

<Data Receiving Processing>

Figure 5:
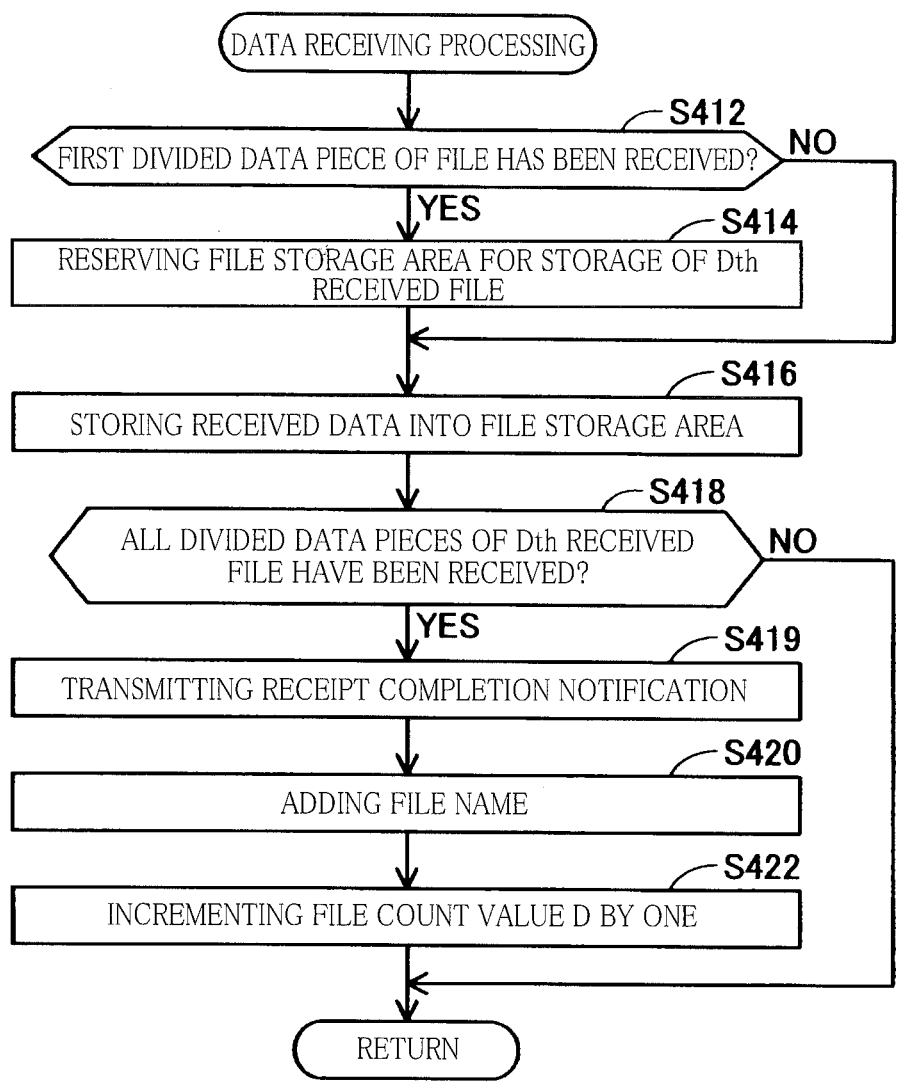
FIG. 5 is a flow chart for explaining a data receiving processing.

There will be next explained the data receiving processing at S340 with reference to FIG. 5. In the data receiving processing, one file is divided into a plurality of divided data pieces (e.g., data packets) and received. The CPU 32 at S412 determines whether the first divided data piece of the file has been received or not. When a negative decision is made at S412 (S412: NO), the CPU 32 determines that the MFP 51 has received one of the divided data pieces constituting the file being received, and this flow goes to S416. When a positive decision is made at S412 (S412: YES), the CPU 32 determines that the next new file has started to be received, and this flow goes to S414.

The CPU 32 at S414 reads the file count value D and reserves a file storage area in the temporary storage area 26 for storage of the Dth received file, and this flow goes to S416. The CPU 32 at S416 stores the received data into the file storage area reserved at S414.

The CPU 32 at S418 determines whether all the divided data pieces of the Dth received file have been received or not. When a negative decision is made at S418 (S418: NO), this flow goes to S346 (FIG. 4). When a positive decision is made at S418 (S418: YES), this flow goes to S419.

The CPU 32 at S419 transmits a receipt completion notification to the communication terminal 100 over the WFD wireless communication 155. The receipt completion notification is information for notifying the communication terminal 100 of a completion of receipt of a file by the MFP 51. The CPU 32 at S420 adds a file name to the file stored in the file storage area of the temporary storage area 26. Various character strings may be used for the file name. For example, the file name used on the communication terminal 100 may be used. Alternatively, the CPU 32 automatically creates a file name using date or a consecutive number, for example. The CPU 32 at S422 increments the file count value D by one, and this flow goes to S346 (FIG. 4).

<Storing-Method Designating Processing>

Figure 6:
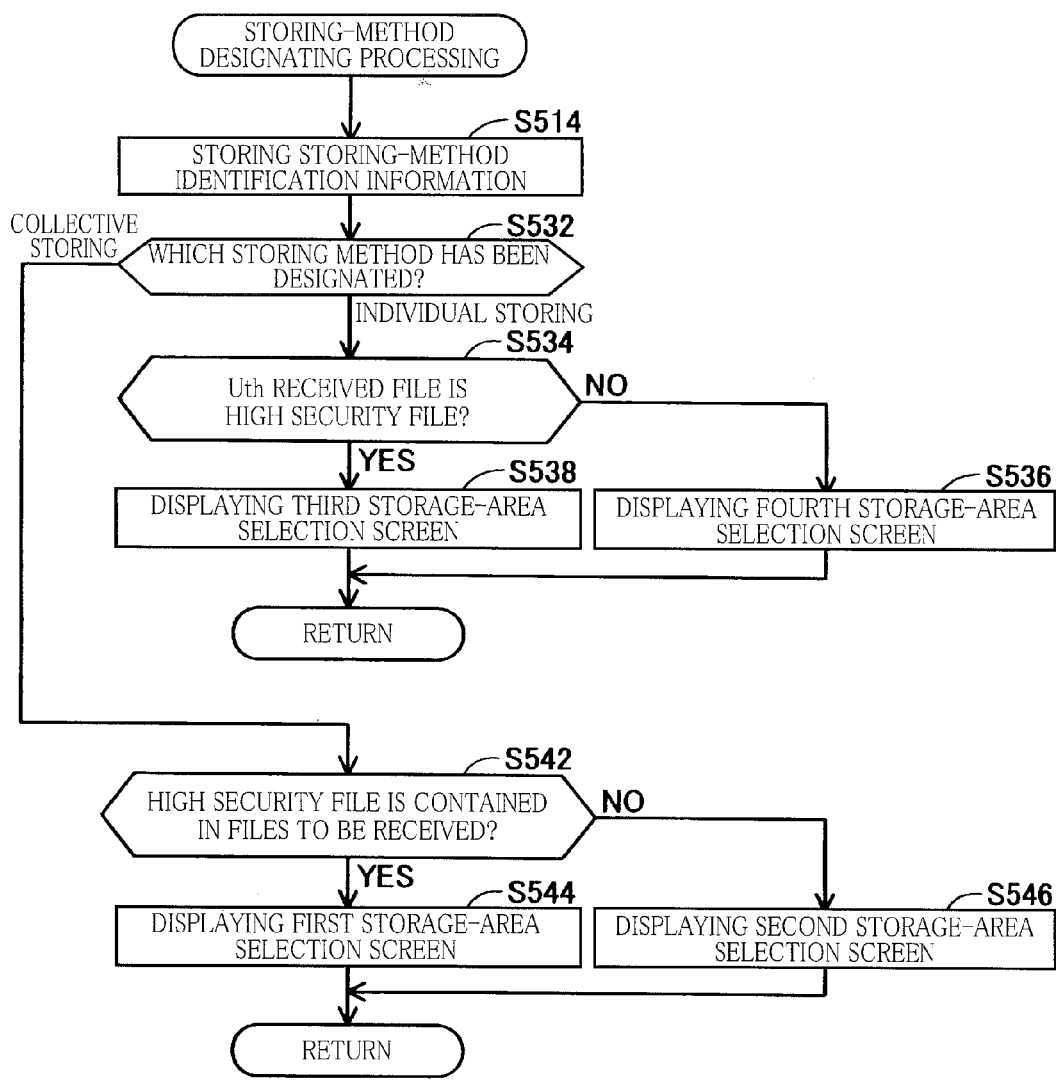
FIG. 6 is a flow chart for explaining a storing-method designating processing.
Figure 13:
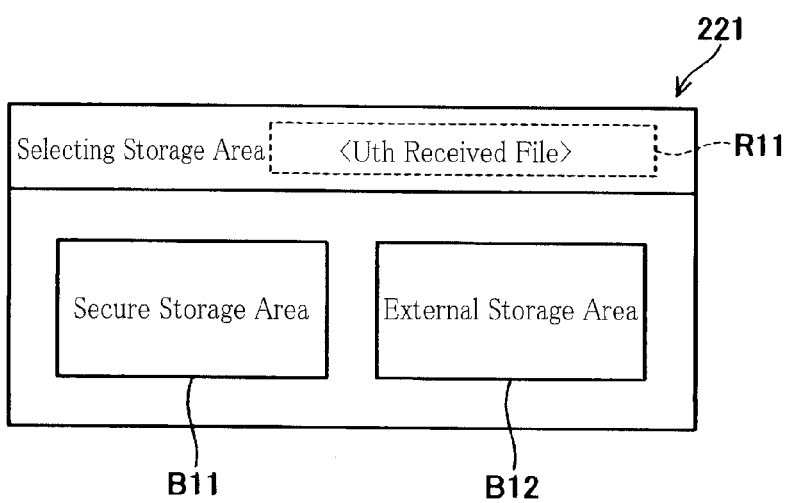
FIG. 13 is a view illustrating one example of a third storage-area selection screen.

There will be next explained the storing-method designating processing at S342 with reference to FIG. 6. The CPU 32 at S514 temporarily stores, into the storage device 33, the storing-method identification information indicative of the storing method designated at S341. When the storing method designated by the user is "Individual Storing" at S532 (S532: INDIVIDUAL STORING), this flow goes to S534. The CPU 32 at S534 reads the storage-area count value U and determines whether the Uth received file is a file to be managed with high security or not. This determination may be made based on the security information contained in the processing identification information. When a positive decision is made at S534 (S534: YES), this flow goes to S538 at which the CPU 32 displays a third storage-area selection screen 221 (see FIG. 13) on the panel 39. The third storage-area selection screen 221 is similar to the first storage-area selection screen 211, and an explanation thereof is omitted. As illustrated in FIG. 13, the third storage-area selection screen 221 contains a region R11 on which is displayed information indicating the Uth received file for which a storage area is to be selected. Upon completion of the processing at S538, this flow goes to S346 (FIG. 4).

Figure 14:
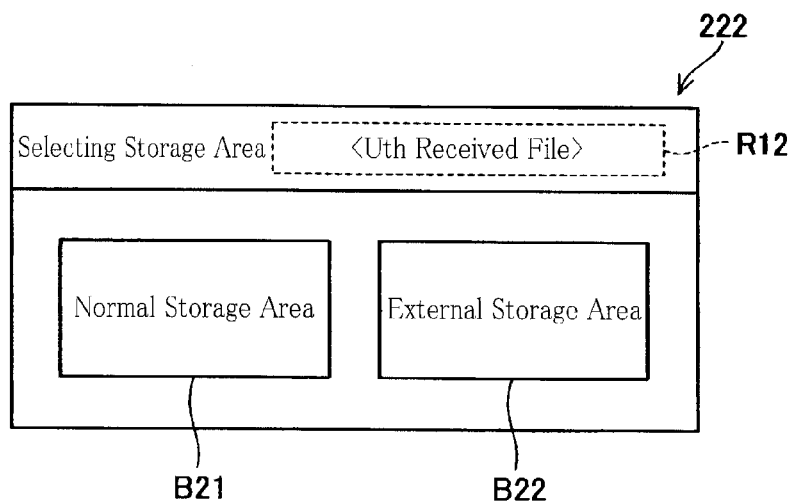
FIG. 14 is a view illustrating one example of a fourth storage-area selection screen.

When a negative decision is made at S534 (S534: NO), this flow goes to S536 at which the CPU 32 displays a fourth storage-area selection screen 222 (see FIG. 14) on the panel 39. The fourth storage-area selection screen 222 is similar to the second storage-area selection screen 212, and an explanation thereof is omitted. As illustrated in FIG. 14, the fourth storage-area selection screen 222 contains a region R12 on which is displayed information indicating the Uth received file for which a storage area is to be selected. Upon completion of the processing at S536, this flow goes to S346 (FIG. 4).

When the CPU 32 determines at S532 that the storing method designated by the user is "Collective Storing" (S532: COLLECTIVE STORING), this flow goes to S542. The CPU 32 at S542 determines whether the high security file or files are included among the files to be received from the communication terminal 100 or not. When a positive decision is made at S542 (S542: YES), this flow goes to S544 at which the CPU 32 displays the first storage-area selection screen 211 (see FIG. 11) on the panel 39. When a negative decision is made at S542 (S542: NO), this flow goes to S546 at which the CPU 32 displays the second storage-area selection screen 212 (see FIG. 12) on the panel 39. Upon completion of the processing at S544 or S546, this flow goes to S346 (FIG. 4).

<Storage-Area Selecting Processing>

Figure 7:
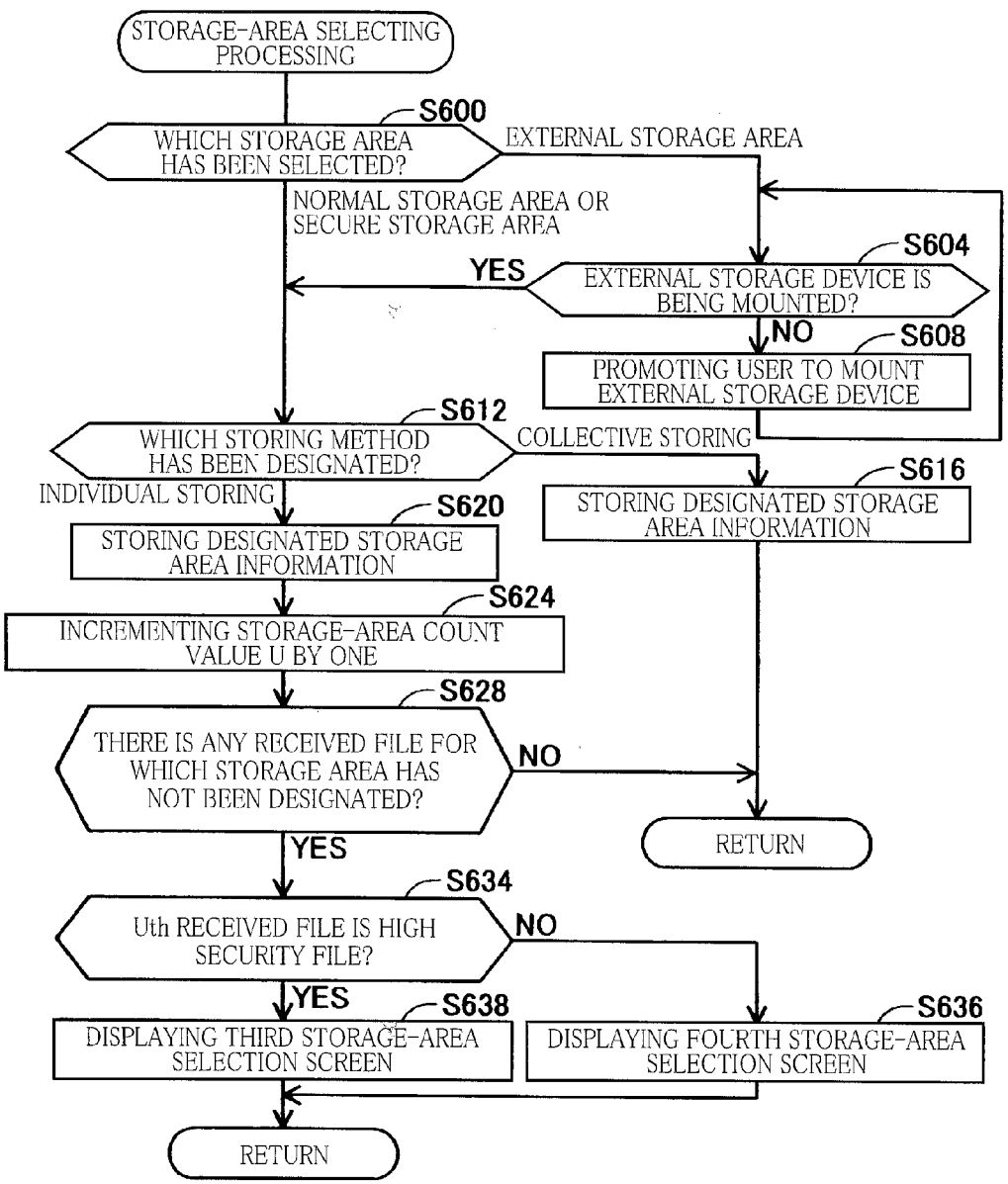
FIG. 7 is a flow chart for explaining a storage-area selecting processing.

There will be next explained the storage-area selecting processing at S344 with reference to FIG. 7. When the CPU 32 determines at S600 that the storage area selected by the user is the external storage area 25 (S600: EXTERNAL STORAGE AREA), this flow goes to S604. The CPU 32 at S604 determines whether the external storage device 35 is being mounted on the MFP 51 or not. When a positive decision is made at S604 (S604: YES), this flow goes to S612. When a negative decision is made at S604 (S604: NO), this flow goes to S608. The CPU 32 at S608 promotes the user to mount the external storage device 35 on the MFP 51. For example, the CPU 32 may control the panel 39 to display a character string "Insert Memory Card". Upon completion of the processing at S608, this flow returns to S604.

When the storage area selected by the user is the normal storage area 23 or the secure storage area 24 (S600: NORMAL STORAGE AREA OR SECURE STORAGE AREA), this flow goes to S612. The CPU 32 at S612 determines whether the storing method designated by the user is "Individual Storing" or "Collective Storing". This determination is made based on the storing-method identification information stored in the storage device 33. When the designated storing method is "Collective Storing" (S612: COLLECTIVE STORING), this flow goes to S616. The CPU 32 at S616 stores, into the storage device 33, the designated storage area information indicating that all the received files are to be stored into the storage area designated by the user, and this flow goes to S346 (FIG. 4). In the present embodiment, when a negative decision is made at S314 (S314: NO), that is, when the number of files to be received is one, the CPU 32 at S612 determines that the designated storing method is "Individual Storing".

When the designated storing method is "Individual Storing" (S612: INDIVIDUAL STORING), this flow goes to S620. The CPU 32 at S620 stores, into the storage device 33, the designated storage area information indicating that the Uth received file is to be stored into the storage area designated by the user. The CPU 32 at S624 increments the storage-area count value U by one.

The CPU 32 at S628 determines whether there is any received file for which the storage area has not been designated. When a negative decision is made at S628 (S628: NO), this flow goes to S346 (FIG. 4). When a positive decision is made at S628 (S628: YES), this flow goes to S634. Processings at S634, S636, and S638 are similar to the respective processings at S534, S536, and S538, and an explanation thereof is omitted.

<Operations of Communication Terminal 100>

Figure 8:
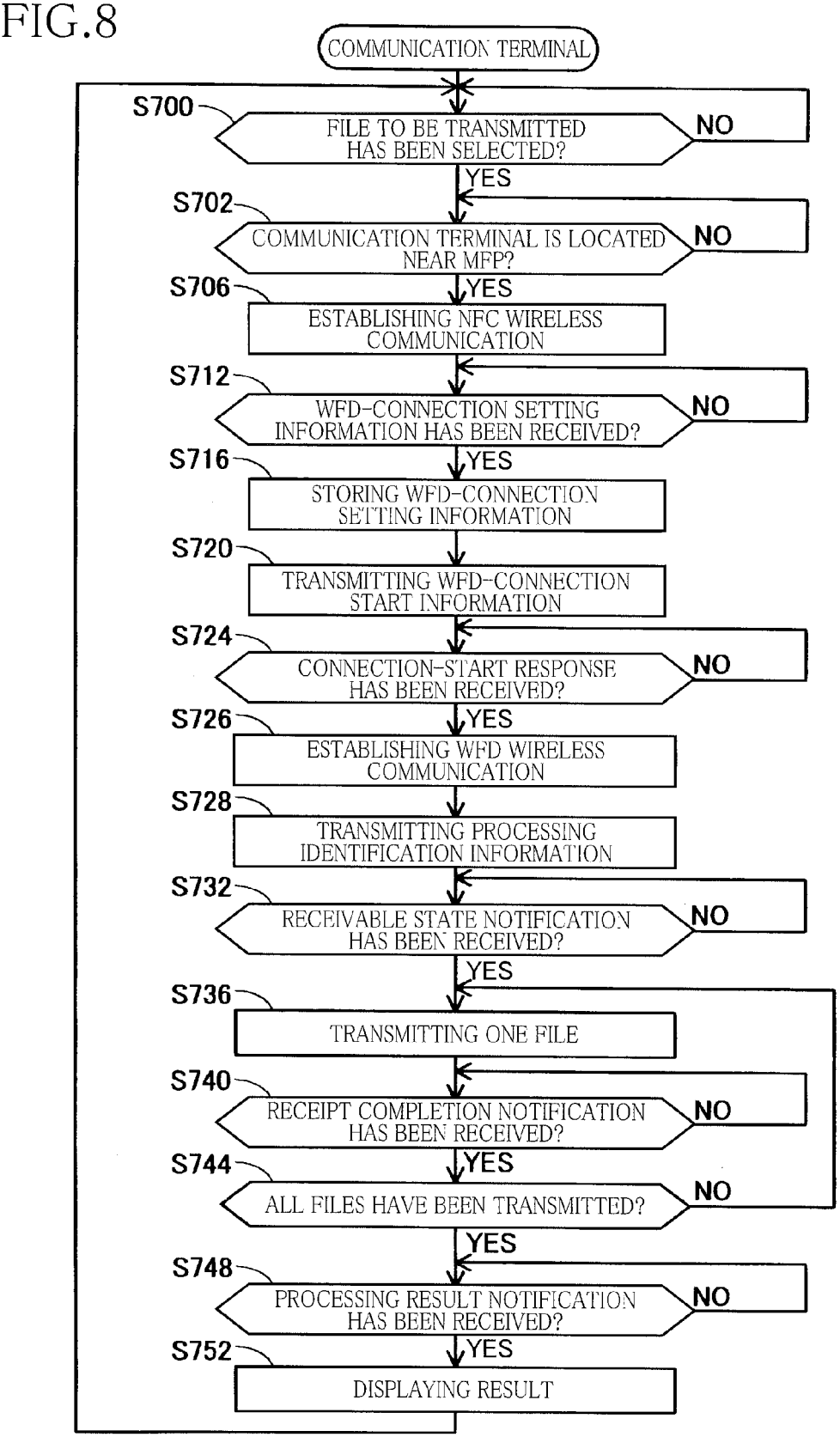
FIG. 8 is a flow chart for explaining operations of a communication terminal.

There will be next explained operations of the communication terminal 100 with reference to FIG. 8. A flow illustrated in FIG. 8 begins when the communication terminal 100 is turned on. The CPU 32 at S700 determines whether or not the user has activated the application 121 and operated the touch panel 103 to select a file to be transmitted. When a negative decision is made at S700 (S700: NO), the CPU 32 repeats the processing at S700. When a positive decision is made at S700 (S700: YES), this flow goes to S702.

This flow begins with S702 at which the CPU 106 determines whether the communication terminal 100 has touched the MFP 51 or not. Specifically, the CPU 106 determines whether the NFC communication interface 36 of the MFP 51 is located within a predetermined distance or range from the NFC communication interface 112 of the communication terminal 100 or not. When a negative decision is made at S702 (S702: NO), the CPU 106 repeats the processing at S702. When a positive decision is made at S702 (S702: YES), this flow goes to S706. The CPU 106 at S706 controls the NFC communication interface 112 to establish the NFC wireless communication 153.

The CPU 106 at S712 determines whether the WFD-connection setting information has been received from the MFP 51 over the NFC wireless communication 153 or not. When a negative decision is made at S712 (S712: NO), the CPU 106 repeats the processing at S712. When a positive decision is made at S712 (S712: YES), this flow goes to S716. The CPU 106 at S716 stores the received WFD-connection setting information into the storage device 109. When a positive decision is made at S712 (S712: YES), this flow goes to S716. The CPU 106 at S716 stores the received WFD-connection setting information into the storage device 109.

The CPU 106 at S720 transmits the WFD-connection start information to the MFP 51 over the NFC wireless communication 153. The CPU 106 at S724 determines whether the connection-start response has been received from the MFP 51 over the NFC wireless communication 153 or not. When a negative decision is made at S724 (S724: NO), the CPU 106 repeats the processing at S724. When a positive decision is made at S724 (S724: YES), this flow goes to S726.

The CPU 106 at S726 controls the wireless LAN interface 105 to establish the WFD wireless communication 155. The WFD wireless communication 155 is established based on the WFD-connection setting information stored in S716.

The CPU 106 at S728 transmits the processing identification information to the MFP 51 over the NFC wireless communication 153. The CPU 106 at S732 determines whether the receivable state notification has been received from the MFP 51 over the WFD wireless communication 155 or not. When a negative decision is made at S732 (S732: NO), this flow repeats the processing at S732. When a positive decision is made at S732 (S732: YES), this flow goes to S736.

The CPU 106 at S736 transmits one file to the MFP 51 over the WFD wireless communication 155. The CPU 106 at S740 determines whether the receipt completion notification has been received from the MFP 51 over the WFD wireless communication 155 or not. When a negative decision is made at S740 (S740: NO), the CPU 106 repeats the processing at S740. When a positive decision is made at S740 (740: YES), this flow goes to S744. The CPU 106 at S744 determines whether all the files have been transmitted or not. When a negative decision is made at S744 (S744: NO), this flow returns to S736 to start transmitting the next file. When a positive decision is made at S744 (S744: YES), this flow goes to S748.

The CPU 106 at S748 determines whether the processing result notification has been received from the MFP 51 over the WFD wireless communication 155 or not. When a negative decision is made at S748 (S748: NO), the CPU 106 repeats the processing at S748. When a positive decision is made at S748 (S748: YES), this flow goes to S752. The CPU 106 at S752 controls the display device 102 to display a result of whether the file has been successfully transmitted to and processed by the MFP 51 or not, and this flow returns to S700.

<Specific Example of Operations>

Figure 15:
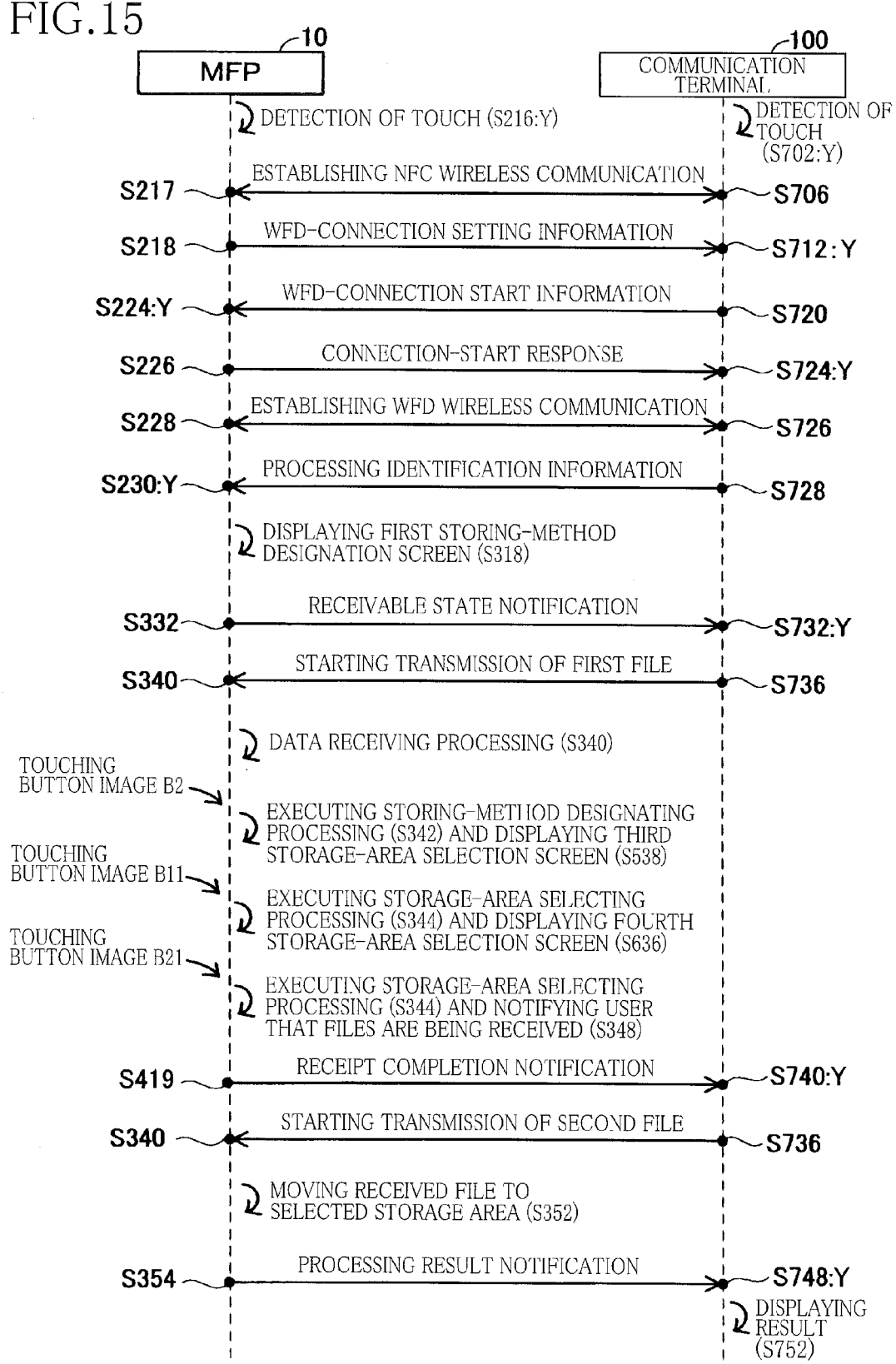
FIG. 15 is a sequence diagram illustrating a specific example of operations of the network.

There will be next explained operations of the network 10 with reference to FIG. 15 by way of specific example. This specific example is explained assuming that the file storing processing is executed, that two files are transmitted from the communication terminal 100 to the MFP 51, that the first one of the two files to be transmitted first is a file to be managed with high security, and that each file is divided into a plurality of data packets and transmitted.

When the user has brought the communication terminal 100 into contact with the MFP 51, the contact or touch is detected (S216: YES, S702: YES). The NFC wireless communication 153 is started (S217, S706), and the WFD-connection setting information is transmitted from the MFP 51 to the communication terminal 100 (S218, S712: YES). The WFD-connection start information is transmitted from the communication terminal 100 to the MFP 51 over the NFC wireless communication 153 (S720, S224: YES). The connection-start response is transmitted from the MFP 51 to the communication terminal 100 over the NFC wireless communication 153 (S226, S724: YES). The WFD wireless communication 155 is established (S228, S726).

The processing identification information is transmitted from the communication terminal 100 to the MFP 51 over the WFD wireless communication 155 (S728, S230: YES). In this specific example, the processing identification information indicates that the data processing is the file storing processing. Also, the processing identification information includes: the number-of-file information indicating that two files are to be transmitted; and the security information indicating that the first file is a high security file. The MFP 51 determines that the data processing is the file storing processing (S232: YES) and starts the file storing processing (S234).

Since the number of files stored is a plural number (S314: YES), and the received files include the high security file (S316: YES), the MFP 51 displays the first storing-method designation screen 201 (see FIG. 9) on the panel 39 (S318). The receivable state notification is transmitted from the MFP 51 to the communication terminal 100 over the WFD wireless communication 155 (S332, S732: YES). The first file starts to be transmitted from the communication terminal 100 to the MFP 51 over the WFD wireless communication 155 (S736).

The MFP 51 detects an occurrence of the event of receiving data (S336: YES, S338: DATA RECEIPT) and starts the data receiving processing (S340).

Since the first data packet of the first file as a new file has been received (S412: YES), the file storage area for storing a received file whose file count value D is one, i.e., the first communication file, is reserved in the temporary storage area 26 (S414). The received first data packet is stored into the reserved file storage area (S416). In a period in which the plurality of the data packets of the first file are being received (S418: NO), a loop processing for repeating receipt of the data packets is executed (S346: NO, S336: YES, S338: DATA RECEIPT, S412: NO, S416). When all the data packets of the first file have been received (S418: YES), the receipt completion notification is transmitted from the MFP 51 to the communication terminal 100 over the WFD wireless communication 155 (S419, S740: YES).

Here, there will be explained a case where the user touches the button image B2 on the first storing-method designation screen 201 (see FIG. 9) during receipt of the first file. In this case, the MFP 51 detects an occurrence of an event of accepting the user input (S336: YES, S338: ACCEPTANCE OF USER INPUT) and determines that the user input is an operation for designating the storing method (S341: DESIGNATION OF STORING METHOD). Accordingly, the storing-method designating processing is executed (S342).

The MFP 51 determines that the designated storing method is "Individual Storing" (S532: INDIVIDUAL STORING) and that the first received file is the high security file (S534: YES). Thus, the MFP 51 displays the third storage-area selection screen 221 (see FIG. 13) on the panel 39 (S538) and waits for a user input. This third storage-area selection screen 221 in FIG. 13 contains the region R11 on which is displayed information indicating the first received file for which a storage area is to be selected.

Here, there will be explained a case where the user touches the button image B11 on the third storage-area selection screen 221 (see FIG. 13). In this case, the MFP 51 detects an occurrence of an event of accepting the user input (S336: YES, S338: ACCEPTANCE OF USER INPUT) and determines that the user input is an operation for selecting the storage area or areas (S341: SELECTION OF STORAGE AREA). Accordingly, the storage-area selecting processing is executed (S344).

The MFP 51 determines that the selected storage area is the secure storage area 24 (S600: SECURE STORAGE AREA) and that the designated storing method is "Individual Storing" (S612: INDIVIDUAL STORING). Thus, the MFP 51 stores, into the storage device 33, the designated storage area information indicating that the first received file is to be stored into the secure storage area 24 (S620). Also, the storage-area count value U is incremented to two (S624). No storage area has been designated for the second received file (S628: YES), and the second received file is not the high security file (S634: NO). Accordingly, the MFP 51 displays the fourth storage-area selection screen 222 (see FIG. 14) on the panel 39 (S636) and waits for a user input. This fourth storage-area selection screen 222 in FIG. 14 contains the region R12 on which is displayed information indicating the second received file for which a storage area is to be selected.

Here, there will be explained a case where the user touches the button image B21 on the fourth storage-area selection screen 222 (see FIG. 14). In this case, the MFP 51 detects an occurrence of an event of accepting the user input (S336: YES, S338: ACCEPTANCE OF USER INPUT) and determines that the user input is an operation for selecting the storage area or areas (S341: SELECTION OF STORAGE AREA). Accordingly, the storage-area selecting processing is executed (S344).

The MFP 51 determines that the selected storage area is the normal storage area 23 (S600: NORMAL STORAGE AREA) and that the designated storing method is "Individual Storing" (S612: INDIVIDUAL STORING). Thus, the MFP 51 stores, into the storage device 33, the designated storage area information indicating that the second received file is to be stored into the normal storage area 23 (S620). Also, the storage-area count value U is incremented to three (S624). Since the storage area has been designated for all the two received files (S628: NO, S346: YES), the MFP 51 controls the panel 39 to display a character string "Data Receiving" (S348).

When the receipt of the first file is completed (S418: YES), the receipt completion notification is transmitted from the MFP 51 to the communication terminal 100 (S419, S740: YES). The second file is transmitted from the communication terminal 100 to the MFP 51 (S736, S340). A processing for transmitting the second file is similar to that for transmitting the first file, and an explanation thereof is omitted.

When a receipt of the second file is completed, a receipt of all the received files is completed (S350: YES). The first received file stored in the file storage area of the temporary storage area 26 is stored into the secure storage area 24. Also, the second received file stored in the file storage area of the temporary storage area 26 is stored into the normal storage area 23. The two received files are then deleted from the temporary storage area 26 (S352). When the processing result notification is transmitted from the MFP 51 to the communication terminal 100 over the WFD wireless communication 155 (S354, S748: YES), the communication terminal 100 controls the display device 102 to display information indicating that the two files have been successfully stored into the MFP 51 (S752).

<Effects>

By bringing the communication terminal 100 near the MFP 51, the user can determine the MFP 51 as a device to which the communication terminal 100 transfers a file or files (S217, S706). The data receiving processing (S340) can be then executed. Also, the MFP 51 can execute the storing-method designating processing (S342) and the storage-area selecting processing (S344) in parallel with the data receiving processing. As a result, a period for executing the storing-method designating processing and the storage-area selecting processing can be used also as a period for executing the data receiving processing. In other words, the period for executing the storing-method designating processing and the storage-area selecting processing overlaps with the period for executing the data receiving processing. Accordingly, it is possible to shorten a total length of time required for communication in the data receiving processing, resulting in improved operability of the user.

In the MFP 51 according to the present embodiment, when the CPU 32 executes the file storing processing (S234) for storing, into the MFP 51, the file or files received from the communication terminal 100, any of the screens 211-222 can be displayed on the panel 39. As a result, each file received from the communication terminal 100 can be stored into the storage area designated by the user (S352).

In the MFP 51 according to the present embodiment, when the high security file is received, the CPU 32 can control the panel 39 to display the screen for accepting a user input for storing the received file into the secure storage area 24, e.g., the first storage-area selection screen 211 and the third storage-area selection screen 221 (S324, S538, S544, S638). This control simplifies the processing for storing the high security file into the secure storage area 24, enhancing the convenience of the user.

In the MFP 51 according to the present embodiment, when the number of received files is two or more (S314: YES), the CPU 32 can control the panel 39 to display the screen for accepting a user input for selecting the collectively storing processing or the individually storing processing, e.g., the first storing-method designation screen 201 and the second storing-method designation screen 202 (S318, S320). As a result, the user can select the collectively storing processing to simplify the operation for selecting the storage area into which the received files are to be stored.

In the MFP 51 according to the present embodiment, when the external storage device 35 is not being mounted on the MFP 51 (S604: No), the CPU 32 can control the panel 39 to display an image for prompting the user to mount the external storage device 35 on the MFP 51 (S608). This control results in reliable storage of the files into the external storage area 25.

In the MFP 51 according to the present embodiment, when all the files have been received (S350: YES), the processing result notification can be transmitted to the communication terminal 100 (S354). As a result, also in a case where the user of the communication terminal 100 is located in a position where the user cannot view the panel 39 of the MFP 51, the MFP 51 can notify the user of a completion of transmission of the file(s) (S752).

In the MFP 51 according to the present embodiment, when the communication method is switched from the NFC wireless communication 153 to the WFD wireless communication 155 (S228), the CPU 32 can control the panel 39 to display a screen such as the first storing-method designation screen 201, the second storing-method designation screen 202, the first storage-area selection screen 211, and the second storage-area selection screen 212 (S318, S320, S324, S326). This control can notify the user of a start of the WFD wireless communication 155.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

<Modifications>

When the NFC wireless communication 153 is established (S217), the CPU 32 may control the panel 39 to display a communication-path-selection accepting screen on which the user selects a communication path to be used for communication of files with the communication terminal 100, between the NFC wireless communication 153 and the WFD wireless communication 155. Examples of images displayed on the communication-path-selection accepting screen include a character string "Select Communication Path" and button images such as an "NFC communication" image and a "WFD communication" image. The MFP 51 may be configured such that when the NFC wireless communication 153 is selected, the CPU 32 may omit the execution of the processings at S217-S228 and may use the NFC wireless communication 153 in the communication after the selection of the NFC wireless communication 153. The MFP 51 may be configured such that when the WFD wireless communication 155 is selected, the flow goes to S218. Thus, the communication path to be used for the data communication can be determined by operation of the user. Also, when files are transferred over the NFC wireless communication 153, the CPU 32 can omit the processing for establishing the WFD wireless communication, making it possible to simplify the communication processing.

Communication standards other than the NFC may be used for communication started when the communication terminal 100 is brought into contact with the MFP 51. For example, standards such as TransferJet™ may be used. The communication path established at S228 is not limited to the WFD wireless communication 155 and may be a communication path in the infrastructure mode via the wireless LAN communication 151, 154.

The processings at S314-S320 may be omitted such that the flow goes from S312 to S322. This modification allows the MFP 51 to always execute the collectively storing processing in the case where the number of files to be received is two or more, eliminating the need for the user to designate the storing method. Also, the processings at S354, S748, and S752 may be omitted. Also, the processings at S224 and S226 may be omitted such that the flow goes from S220 to S228. As a result, it is possible to shorten a length of time extending from the transmission of the WFD-connection setting information (S218) to the establishment of the WFD wireless communication 155 (S228). In view of the above, the CPU 32 of the MFP 51 only needs to execute at least a first display control processing, a first obtaining processing, and a data-processing execution processing. For example, the CPU 32 only needs to execute at least one of the processings at S318, S320, S324, S326, S538, S536, S544, S546, S636, and S638, the processing at S340, and one of the processings at S352 and S236.

A timing when the received files are stored into the storage area or areas selected in the storage-area selecting processing is not limited to a timing when all the received files have been received from the communication terminal 100. For example, when a storage area for one received file received from the communication terminal 100 is selected in the storage-area selecting processing, the one received file may be stored into the selected storage area. In this configuration, the processing for storing the received file into the storage area selected in the storage-area selecting processing can be executed in parallel with the data receiving processing.

The storing-method designating processing at S342 and the storage-area selecting processing at S344 may be various processings. For example, in a case where the data processing is the print processing, the CPU 32 may execute a setting accepting processing for accepting various settings for printing of the printer 19 such as a sheet size, a resolution, and a print color (i.e., print in color or print in black and white). The MFP 51 may execute the setting accepting processing in parallel with the data receiving processing for receiving files for printing.

The communication of the file is not limited to the transmission of the file from the communication terminal 100 to the MFP 51. For example, the communication includes a transmission of the file from the MFP 51 to the communication terminal 100. In this case, processing identification information for commanding execution of a file transmission processing may be received from the communication terminal 100 at S230. The file transmission processing is a processing for sending the communication terminal 100 a scan file created by the scanner 20 and a file stored in the storage device 33. The MFP 51 may execute the storing-method designating processing (S342) and the storage-area selecting processing (S344) in parallel with the processing for transmitting the file to the communication terminal 100.

The screens displayed on the panel 39 in FIGS. 9-14 are illustrated by way of examples. Various images may be displayed on the panel 39. For example, the button image B21 for selecting the normal storage area may be contained in the first storage-area selection screen 211 illustrated in FIG. 11 and the third storage-area selection screen 221 illustrated in FIG. 13. In this display, not only the secure storage area and the external storage area but also the normal storage area can be selected as a storage area for the received files including at least one high security file.

The communication terminal 100 is one example of an external device. The NFC standard is one example of a first communication standard. The NFC wireless communication 153 is one example of first wireless communication. Each of the NFC communication interfaces 36, 112 is one example of a first communication interface. The WFD standard is one example of a second communication standard. The WFD wireless communication 155 is one example of second wireless communication. Each of the wireless LAN interfaces 34, 105 is one example of a second communication interface. Each of the CPUs 32, 106 is one example of a processor. The MFP 51 is one example of an information processing apparatus. Each of the method designated as the storing method and the area selected as the storage area is one example of related information. Each of the first storing-method designation screen 201, the second storing-method designation screen 202, the first storage-area selection screen 211, the second storage-area selection screen 212, the third storage-area selection screen 221, and the fourth storage-area selection screen 222 is one example of an input screen. The panel 39 is one example of a display device. The processings at S318, S320, S324, S326, S538, S536, S544, S546, S636, and S638 are one example of the first display control processing. The processing at S340 is one example of the first obtaining processing. Each of the file storing processing and the print processing is one example of the data processing. The processings at S352, S236 are one example of the data-processing execution processing. The WFD-connection setting information is one example of first setting information. The processing at S218 is one example of a communication processing. The processing at S230 is one example of a second obtaining processing. The normal storage area 23 is one example of a first storage area. The secure storage area 24 is one example of a second storage area. The high security file is one example of first communication data. The button image B21 is one example of a first image. The number-of-file information is one example of number-of-data-set information. The processings at S230 is one example of a third obtaining processing. The processings at S608 is one example of a second display control processing. The processing result notification is one example of information indicating a completion of a processing for obtaining at least one communication data set. The printer 19 is one example of a printing device.

What is claimed is:

1. An information processing apparatus comprising:
  a first communication interface configured to carry out first wireless communication with an external device according to a first communication standard when a distance between the external device and the first communication interface becomes equal to or less than a first distance;
  a processor; and
  a memory configured to store a plurality of instructions, the plurality of instructions, when executed by the processor, causing the information processing apparatus to execute:
    a first determining processing in which, in response to an establishment of the first wireless communication, the information processing apparatus receives processing identification information from the external device and determines whether a processing identified from the received processing identification information is a storing processing, the storing processing being a processing which causes the information processing apparatus to store at least one communication data set obtained from the external device into one of a plurality of storage areas;
    a first display control processing in which when it is determined in the first determining processing that the processing identified from the processing identification information is the storing processing, the information processing apparatus controls a display device thereof to display an input screen before starting to obtain the at least one communication data set from the external device, the input screen accepting a selection of one of the plurality of storage areas;
    a first obtaining processing in which when it is determined in the first determining processing that the processing identified from the processing identification information is the storing processing, the information processing apparatus starts to obtain the at least one communication data set transmitted from the external device, irrespective of whether the selection of the one of the plurality of storage areas is accepted or not; and
    a data-processing execution processing in which when the selection of one of the plurality of storage areas has been accepted and when the receipt of the at least one communication data set in the first obtaining processing are completed, the information processing apparatus stores the obtained at least one communication data set into the selected storage area selected in the first display control processing.

2. The information processing apparatus according to claim 1, further comprising a second communication interface configured to carry out second wireless communication with the external device according to a second communication standard,
  wherein when executed by the processor, the plurality of instructions cause the information processing apparatus to execute:
    a communication processing in which the information processing apparatus transfers first setting information with the external device over the first wireless communication to establish the second wireless communication with the external device; and
    the first obtaining processing in which the information processing apparatus obtains the at least one communication data set over the second wireless communication.

3. The information processing apparatus according to claim 2, wherein when executed by the processor, the plurality of instructions cause the information processing apparatus to execute:
  a second obtaining processing in which the information processing apparatus obtains number-of-data-set information from the external device after the first wireless communication is started, the number-of-data-set information representing the number of communication data sets; and
  the first display control processing in which when the number-of-data-set information represents that the at least one communication data set is a plurality of communication data sets, the information processing apparatus controls the display device to display the input screen which accepts a selection of whether the plurality of communication data sets are to be stored into one storage area or selectively into at least two storage areas.

4. The information processing apparatus according to claim 3, wherein when executed by the processor, the plurality of instructions cause the information processing apparatus to execute an output processing in which when the number of communication data sets obtained in the first obtaining processing has reached the number of communication data sets which is represented by the number-of-data-set information, the information processing apparatus outputs information to the external device over the second wireless communication, the information indicating a completion of the first obtaining processing.

5. The information processing apparatus according to claim 2, wherein when executed by the processor, the plurality of instructions cause the information processing apparatus to execute the first display control processing in which the information processing apparatus controls the display device to display the input screen when the second wireless communication is started.

6. The information processing apparatus according to claim 2,
wherein the first communication interface is an interface for short-distance wireless communication,
wherein the second communication interface is an interface for a wireless LAN, and
wherein the first setting information comprises a service set identifier (SSID).

7. The information processing apparatus according to claim 1,
wherein the plurality of storage areas comprises a first storage area and a second storage area, and security of the second storage area is greater than that of the first storage area,
wherein when executed by the processor, the plurality of instructions cause the information processing apparatus to execute:
the first display control processing in which when first communication data as the obtained at least one communication data set is data to be managed with greater security than second communication data, the information processing apparatus controls the display device such that the input screen contains a first image for a selection of the second storage area as a storage area for storing the first communication data; and
the data-processing execution processing in which when the first image is selected, the information processing apparatus stores the first communication data into the second storage area.

8. The information processing apparatus according to claim 1, further comprising an external storage device which is removably mounted,
wherein when executed by the processor, the plurality of instructions cause the information processing apparatus to execute:
the first display control processing in which the information processing apparatus controls the display device to display the input screen which accepts an operation for selecting the external storage device as one of the plurality of storage areas; and
a second display control processing in which when the external storage device is selected and when the external storage device is not in a usable state, the information processing apparatus controls the display device to display information prompting for establishment of the usable state of the external storage device.

9. The information processing apparatus according to claim 1, wherein when executed by the processor, the plurality of instructions cause the information processing apparatus to execute the data-processing execution processing in which the information processing apparatus controls a printing device thereof to execute a print processing based on the at least one communication data set.

10. The information processing apparatus according to claim 1, wherein when executed by the processor, the plurality of instructions cause the information processing apparatus to execute the first obtaining processing in which the information processing apparatus obtains the at least one communication data set over the first wireless communication.

11. A non-transitory storage medium storing a plurality of instructions executable by a processor of an information processing apparatus, the information processing apparatus comprising: a first communication interface configured to carry out first wireless communication with an external device according to a first communication standard when a distance between the external device and the first communication interface becomes equal to or less than a first distance; and the processor;
the plurality of instructions, when executed by the processor, causing the information processing apparatus to execute:
a first determining processing in which, in response to an establishment of the first wireless communication, the information processing apparatus receives processing identification information from the external device and determines whether a processing identified from the received processing identification information is a storing processing, the storing processing being a processing which causes the information processing apparatus to store at least one communication data set obtained from the external device into one of a plurality of storage areas;
a first display control processing in which when it is determined in the first determining processing that the processing identified from the processing identification information is the storing processing, the information processing apparatus controls a display device thereof to display an input screen before starting to obtain the at least one communication data set from the external device, the input screen accepting a selection of one of the plurality of the storage areas;
a first obtaining processing in which when it is determined in the first determining processing that the processing identified from the processing identification information is the storing processing, the information processing apparatus starts to obtain the at least one communication data set transmitted from the external device, irrespective of whether the selection of the one of the plurality of storage areas is accepted or not; and
a data-processing execution processing in which when the selection of one of the plurality of storage areas and when the receipt of the at least one communication data set in the first obtaining processing are completed, the information processing apparatus stores the obtained at least one communication data set into the selected storage area selected in the first display control processing.

12. The non-transitory storage medium according to claim 11, further comprising a second communication interface configured to carry out second wireless communication with the external device according to a second communication standard, wherein when executed by the processor, the plurality of instructions cause the information processing apparatus to execute:
  a communication processing in which the information processing apparatus transfers first setting information with the external device over the first wireless communication to establish the second wireless communication with the external device; and
  the first obtaining processing in which the information processing apparatus obtains the at least one communication data set over the second wireless communication.

13. The non-transitory storage medium according to claim 12, wherein when executed by the processor, the plurality of instructions cause the information processing apparatus to execute:
  a second obtaining processing in which the information processing apparatus obtains number-of-data-set information from the external device after the first wireless communication is started, the number-of-data-set information representing the number of communication data sets; and
  the first display control processing in which when the number-of-data-set information represents that the at least one communication data set is a plurality of communication data sets, the information processing apparatus controls the display device to display the input screen which accepts a selection of whether the plurality of communication data sets are to be stored into one storage area or selectively into at least two storage areas.

14. The non-transitory storage medium according to claim 13, wherein when executed by the processor, the plurality of instructions cause the information processing apparatus to execute an output processing in which when the number of communication data sets obtained in the first obtaining processing has reached the number of communication data sets which is represented by the number-of-data-set information, the information processing apparatus outputs information to the external device over the second wireless communication, the information indicating a completion of the first obtaining processing.

15. The non-transitory storage medium according to claim 12, wherein when executed by the processor, the plurality of instructions cause the information processing apparatus to execute the first display control processing in which the information processing apparatus controls the display device to display the input screen when the second wireless communication is started.

16. The non-transitory storage medium according to claim 11,
  wherein the plurality of storage areas comprises a first storage area and a second storage area, and security of the second storage area is greater than that of the first storage area,
  wherein when executed by the processor, the plurality of instructions cause the information processing apparatus to execute:
    the first display control processing in which when first communication data as the obtained at least one communication data set is data to be managed with greater security than second communication data, the information processing apparatus controls the display device such that the input screen contains a first image for a selection of the second storage area as a storage area for storing the first communication data; and
    the data-processing execution processing in which when the first image is selected, the information processing apparatus stores the first communication data into the second storage area.

17. The non-transitory storage medium according to claim 11, further comprising an external storage device which is removably mounted,
  wherein when executed by the processor, the plurality of instructions cause the information processing apparatus to execute:
    the first display control processing in which the information processing apparatus controls the display device to display the input screen which accepts an operation for selecting the external storage device as one of the plurality of storage areas; and
    a second display control processing in which when the external storage device is selected and when the external storage device is not in a usable state, the information processing apparatus controls the display device to display information prompting for establishment of the usable state of the external storage device.

18. The non-transitory storage medium according to claim 11, wherein when executed by the processor, the plurality of instructions cause the information processing apparatus to execute the data-processing execution processing in which the information processing apparatus controls a printing device thereof to execute a print processing based on the at least one communication data set.

* * * * *